United States Patent [19]

Hodges

[11] 4,092,783

[45] June 6, 1978

[54] FLAT PLANE HOLDING FIXTURE

[76] Inventor: James J. Hodges, 1127 S. 6th St., Louisville, Ky. 40203

[21] Appl. No.: 713,324

[22] Filed: Aug. 10, 1976

[51] Int. Cl.² ............................ B25B 5/02; B25B 5/14
[52] U.S. Cl. .................................... 33/180 R; 269/109
[58] Field of Search ................... 33/180 R, 184.5, 191; 269/109, 110, 41; 250/456

[56] References Cited

U.S. PATENT DOCUMENTS 1,221,601  4/1917  Rowland .............................. 269/109

Primary Examiner—Richard E. Aegerter
Assistant Examiner—Willis Little
Attorney, Agent, or Firm—David H. Semmes

[57] ABSTRACT

A flat plane holding fixture for use in positioning X-ray cassettes and the like with respect to an X-ray camera. The fixture is characterized by its ability to center with respect to the camera cassettes of varying sizes, while determining both the cassette size and its orientation either upon a longitudinal or a transverse axis.

6 Claims, 11 Drawing Figures

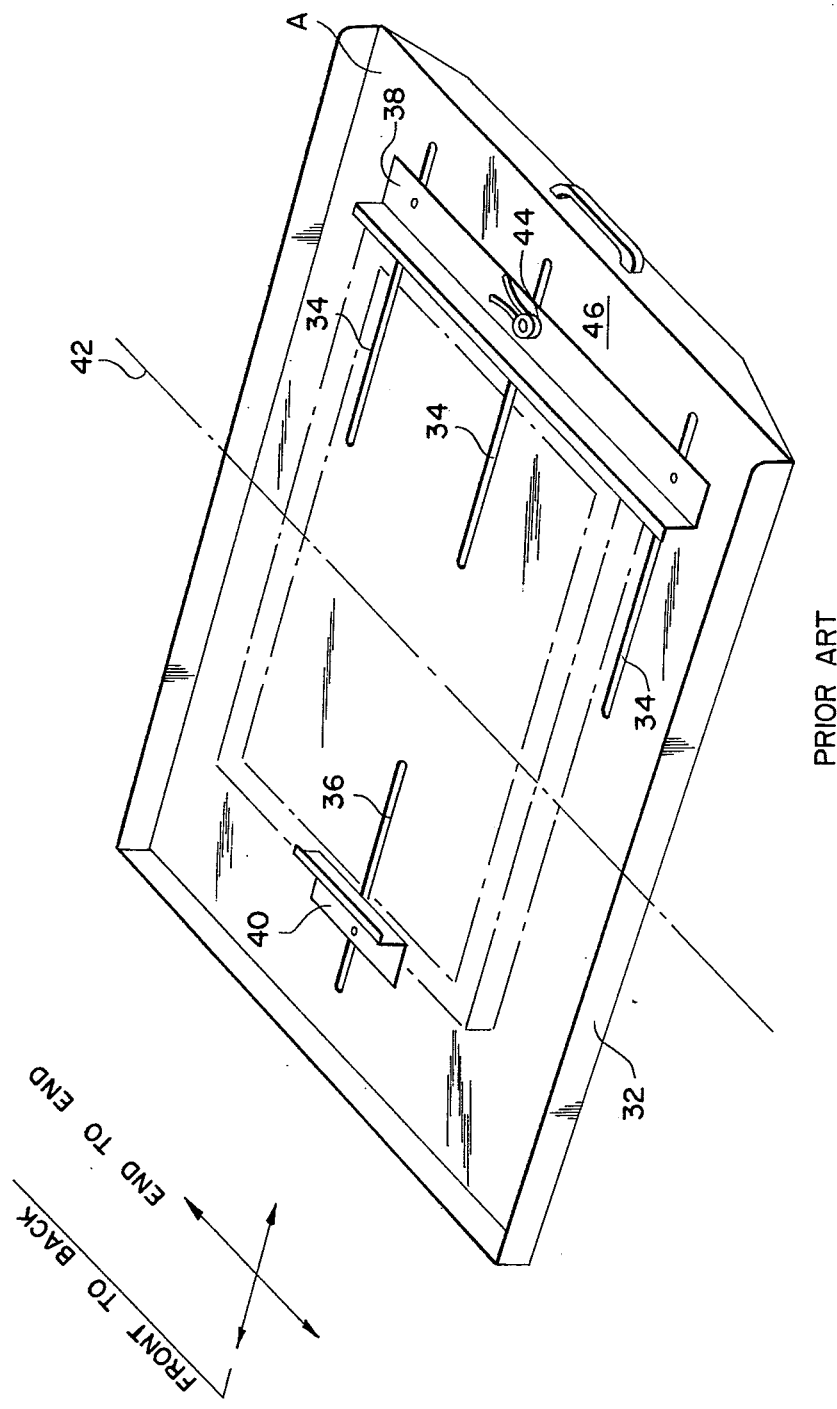

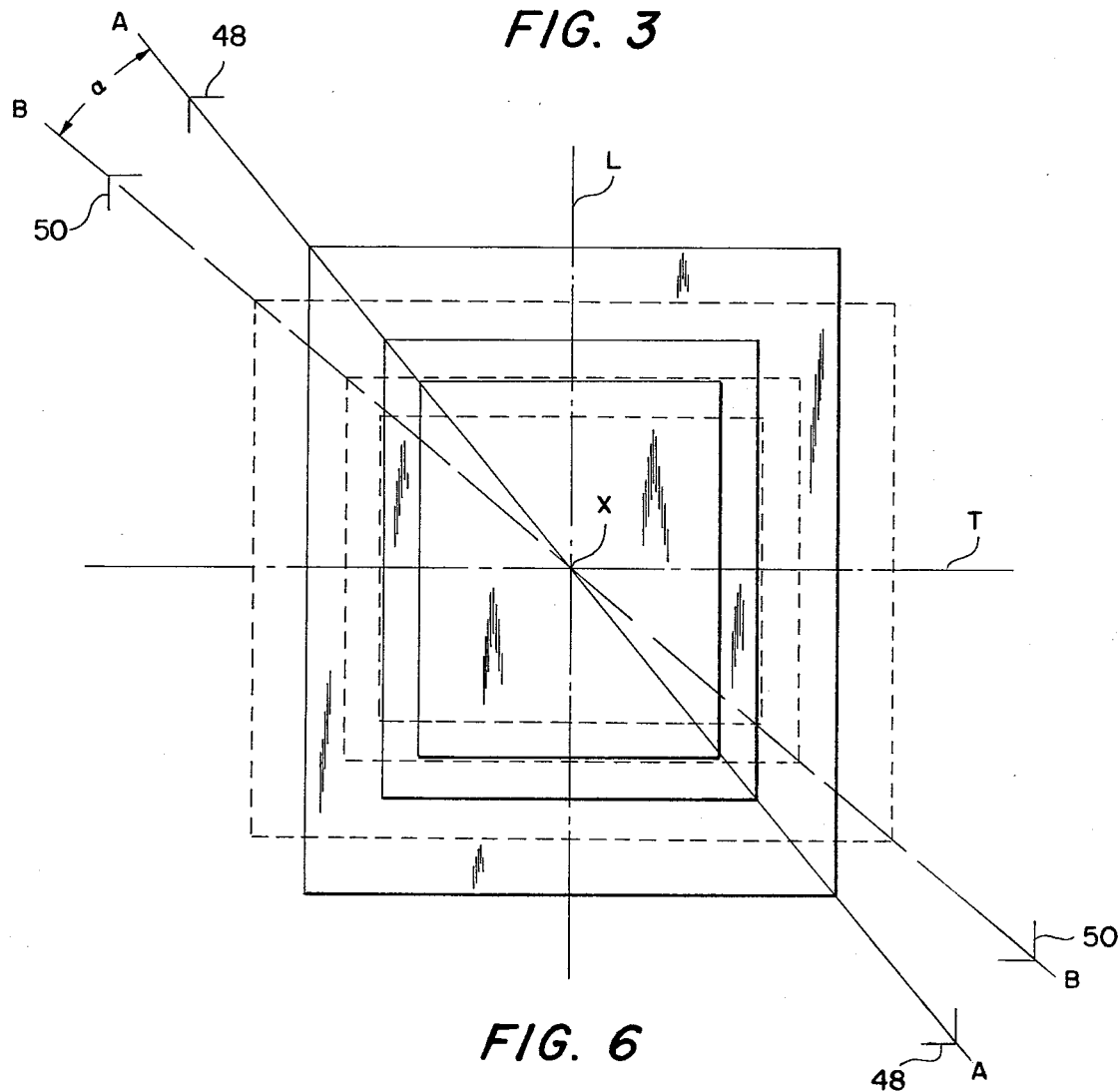

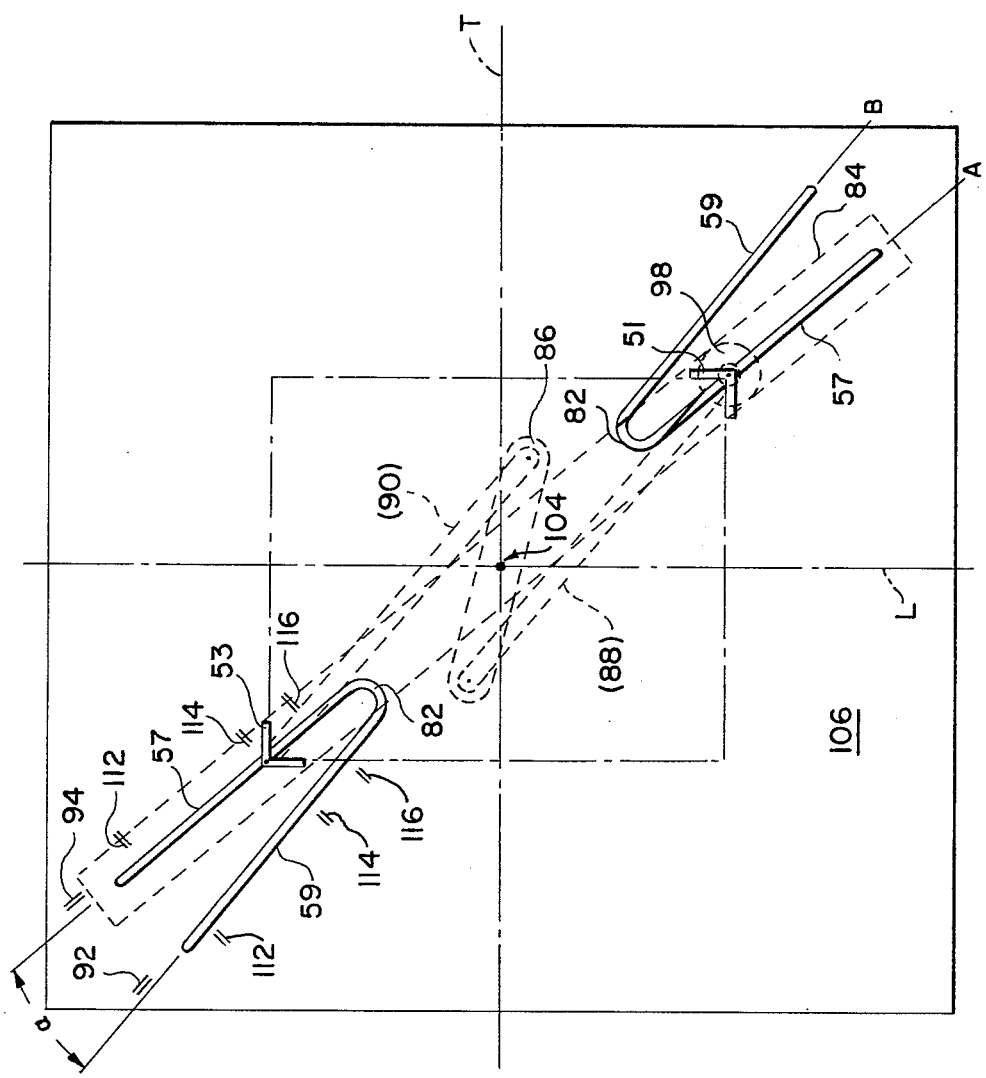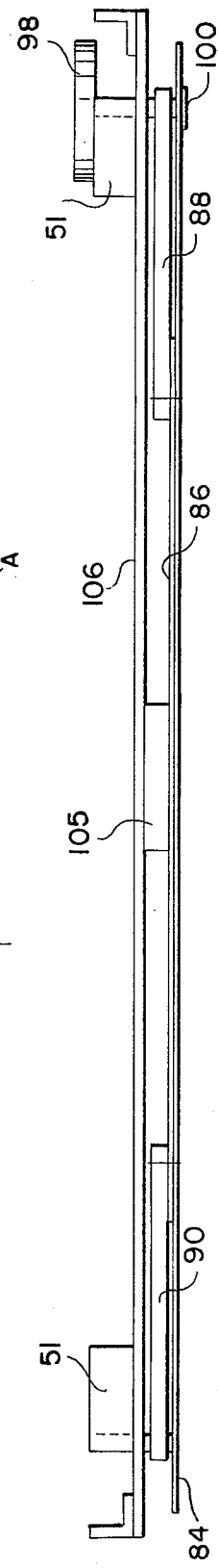

4,092,783

FLAT PLANE HOLDING FIXTURE

BACKGROUND OF THE INVENTION (1) Field of the Invention

Various flat plane holding devices are in use today for positioning electronic circuit boards, parts to be machined, pictures, photographic film and the like. However, conventional devices do not have the ability to accurately center variously sized planes or to determine the orientation of the plane whether it be upon a longitudinal or a transverse axis.

(2) Description of the Prior Art
BARTON: U.S. Pat. No. 3,888,476
DAY: U.S. Pat. No. 3,590,458
MADSEN: U.S. Pat. No. 1,612,299
BERGSTROM: U.S. Pat. No. 1,342,891
DUUS: U.S. Pat. No. 1,000,725
LAWSON: U.S. Pat. No. 840,777
JACOBS: U.S. Pat. No. 744,555
REISSMANN: U.S. Pat. No. 604,160

The foregoing patents teach various clamp means for positioning of articles with respect to cameras, machine devices and the like. However, none of them suggest means for automatically centering congruent rectangles or indicating relative orientation either upon a longitudinal or transverse axis. The prior devices broadly illustrate using two pairs of diagonal clamping devices positionable against variously sized rectangular pieces. However, there is no suggestion of employing a single pair of clamps and associated circuitry for sensing both the size and orientation of variously sized rectangles. Furthermore, the prior art does not suggest the employment of a single arcuate slot for permitting travel of the clamping devices along separate linear paths of orientation.

The patent to Barton is merely of interest for an articulated arm arrangement useful for symmetrically mounting and clamping variously angled corners within a frame structure.

The patent to Day shows a holding fixture wherein four pivoted arms respectively carry right angle corner clamps which are manually slideable movement along each arm. Any centering of a frame with the device of Day requires careful manual adjustment of all runners to ensure that the respective sides of a frame properly define a rectangular assembly.

The manual clamping device of Madsen similarly provides for rotating arms with diagonal opposite clamping elements being moved equal amounts, relative to the center, through operation of a single hand crank. However, the diagonal clamp of Madsen has no provision for sensing orientation of a held rectangular piece. Nor does Madsen provide for a pair of guide slots, operable for selectively positioning the locus of travel for diagonal holders along a line A, or a second line B.

The early patent to Bergstrom teaches a clamp for repeatedly clamping one given size of a frame through the provision of a treadle, and associated chain, for simultaneously urging four miter clamps inwardly.

The patent to Duus illustrates a miter clamping assembly which includes, at FIG. 6, a series of rack and pinion devices for adjusting the size of the frame to be clamped. However, again all four clamps are articulated together and there is no provision for an automatic clamping which develops an orientation output signal.

The clamp of Lawson is another articulated holding fixture which provides for clamping mitered corners through a single adjustment. Again, Lawson is without structural or functional similarity to your client's automatic positioning device.

The clamp of Jacobs is analogous to the prior-art type of clamp conventionally used to hold X-ray cassettes. In Jacobs there is no provision for centering congruently sized rectangles with respect to a mid-point on the holding fixture.

Finally, the very early patent to Reissmann illustrates another form of miter clamp wherein four holding fixtures are mutually rotated through a single crank handle by an associated central gear assembly.

SUMMARY OF THE INVENTION

According to the present invention a flat plane holding fixture includes a base plate having pairs of aligned slots. The first pair of aligned slots defines orientation of the object being held upon a longitudinal axis and the second pair of aligned slots defines orientation of the object being held upon a transverse axis. A pair of opposed clamps may be mounted within each pair of aligned slots, so as to abut opposed corners of the objects being held. Linkage pivoted at the center point intersection of the longitudinal and transverse axes of the fixture may interconnect the clamping members beneath the base, so as to govern constant equidistant disposition of the clamps with respect to the center point. The device may include a locking mechanism for locking the clamps in place. Also, an electrically energized sensing circuit may be employed, together with the clamps and slots, to sense the dimensions of the object being held, as well as its orientation upon either the longitudinal or transverse axes.

BRIEF DESCRIPTION OF THE DRAWINGS

FIG. 2 is an enlarged pespective, showing positioning of an X-ray cassette (shown in phantom) in a typical holding fixture.

FIG. 3 is a schematic view, showing orientation of variously sized X-ray cassettes (e.g. 8, 10, and 14 inch widths) upon the longitudinal axis L wherein the corners are aligned along slot A—A and upon the transverse axis T (illustrated in phantom) wherein the corners are aligned along slot B—B.

FIG. 5 is a similar view showing a further modification wherein the first and second pairs of slots are joined such that a single pair of opposed clamps may be employed in the two pairs of slots.

FIG. 6 is a circuit diagram showing the use of width indicating sensors adjacent the slots.

FIG. 8 is a side elevation, showing the device illustrated in FIG. 5.

DESCRIPTION OF THE PREFERRED EMBODIMENT

A flat plane holding fixture, characterized by its ability to self-center multiple dimensional size planes. Further, centering of the plane is accomplished automatically at the time of clamping. In addition, this device can determine the orientation of the plane, (i.e., long side upon a longitudinal or transverse axis).

In general, many flat plane-holding devices are in use today. Such devices are used to hold electronic circuit boards, parts to be machined, pictures, photographic film, etc., but none of these existing devices have the ability to "center" various size planes and determine the orientation of the plane.

While this specific holding device was designed for use in holding a filmholding cassette used in the X-ray field, its application and use in other areas will be readily apparent.

Figure 1:
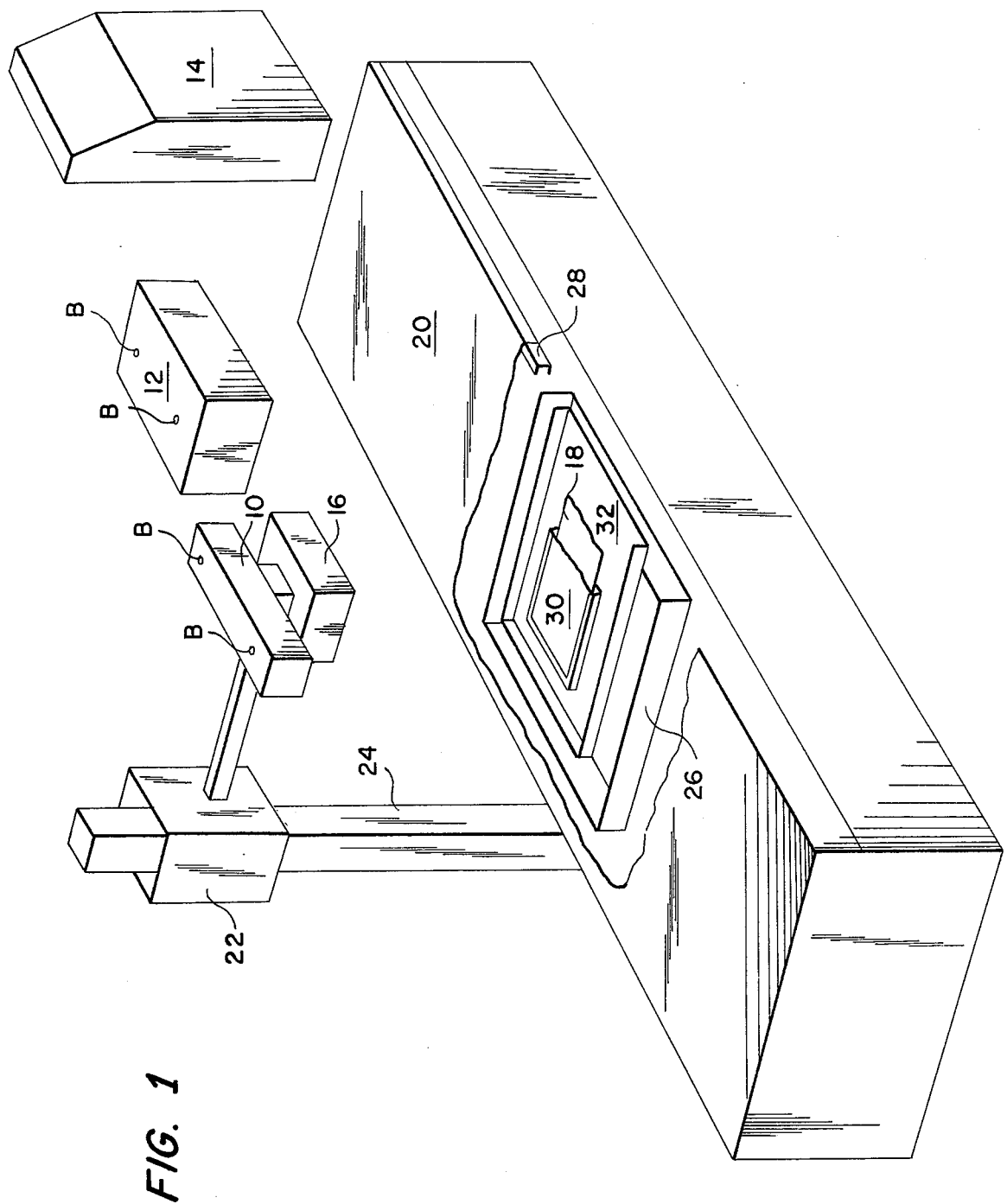
FIG. 1 is a perspective view, showing positioning of the flat plane holding fixture in an X-ray photographic device.

FIG. 1 shows the components of a standard X-ray machine.

Item 10 is the X-ray tube. Two high voltage leads are connected to the tube at Point B and to a high voltage generating transformer 12. The transformer 12 in turn is connected to a main control console 14. Control console 14 contains the electrical circuits (illustrated in FIGS. 6 and 7) which, in proper sequence send an electrical signal to transformer 12 to generate high voltage to X-ray tube 10. This high voltage causes tube 10 to generate X-rays which are directed by the collimater 16 to an emulsified film 18. The item to be X-rayed (not illustrated) is placed between the collimator 16 and the film 18 such that the X-rays generated by X-ray tube 10 can pass through the item.

A table 20 is provided to support the item to be X-rayed above the film.

A tube carrier assembly 22 as used to support the X-ray tube 10, is connected to a vertical support column 24 through rollers (not illustrated, such that X-ray tube 10 can be moved up and down to vary the vertical distance between the X-ray tube 10 and the film 18.

Vertical support column 24 is connected to the item support table 20 through rollers such that X-ray tube 10 can be moved from one end of the item support table 20 to the other.

Likewise, a means is provided in the item support table 20 for moving the film 18 from one end of table 20 to the other, such that the film 18 can be located directly under the X-ray tube 10. This provision generally is in the form of a box-like structure, called a "bucky" 26 which connects to the item support table 20 through rollers and guide bars or tracks 28 attached to the front and back of item support table 20.

Bucky 26 is designed to house electrical signaling devices, and a means for preventing scatter radiation of X-rays (not shown) in addition to providing the film transport function.

Since the recording of X-rays on film 18 is a photographic process, film 18 must be protected from exposure to ambient light while being transported to the X-ray machine and from the machine to the developing room. This protection is generally in the form of a cassette 30. A cassette is a thin box approximately ⅜ thick with a hinged frame that allows it to be opened to receive the film and then closed to seal the film from the ambient light. One surface of the cassette is of a material which readily passes X-rays, but is opaque to visible light.

The frame of the cassette is made as small as possible to minimize the size. However, the cassette size is generally 1¼ larger than the standard film sizes of 8 × 10, 10 × 12, 14 × 17.

A tray 32 is used to connect the cassette to the bucky. As illustrated in FIG. 2 trays are sheet metal construction, generally stainless steel 0.030 to 0.050 thick flanged and ribbed for stiffness. They are completely removable from the bucky for loading and unloading of the cassette. The common tray 32 has parallel slots 34, 36 running in the front to back direction to receive two parallel bars 38, 40 perpendicular to the slots, and sliding on the top surface 46 of tray 32. Bars 38 and 40 are connected through suitable linkage to cause them to move together and apart at equal rates with respect to centerline 42 of the tray.

A lock 44 is provided to clamp the bars once they are in place. This is generally a simple friction device which, by screw action, clamps bar 38, 40 to tray top surface 46.

To "load" the conventional tray, the parallel bars 38, 40 are spread apart and the cassette placed in between them. The bars are then moved towards each other, clamping the cassette between them and centering the cassette in the front to back direction upon a longitudinal axis. Conventionally, no provisions are made to center the cassette in end to end or side to side direction.

Another serious shortcoming with the conventional tray is the lack of means for sensing the orientation of the cassette being clamped. For example, an 8 × 10 inches cassette can be installed with the 8 inches dimension front to back (transverse axis) and the 10 inches dimension front to back (transverse axis,) the bars are again 10 inches apart.

New Federal regulations require control with the film centering and the size of film being used. Conventional trays do not have provisions for centering the film or the film-holding cassette nor do they have the ability to determine orientation within the mechanism of linkages.

There follows a disclosure of an X-ray tray which bolt centers the film-holding cassette, hence the film, and determines orientation of the film.

FIG. 3 shows three of the most popular size X-ray films, (i.e., 8 × 10, 10 × 12, 14 × 17) and the various rectangular positions which are used.

The solid lines show the cassette oriented with their longer dimensions running front to back (longitudinal axis), while the dotted lines show the same films as they are used with the long dimension running side to side (transverse axis). It should be noted that each of the three films shown in two positions has a common center (X).

Note that for either of the two position groups, a straight line A—A or B—B can be drawn through the center point and in close proximity to each of the corners of the rectangular shaped film.

For example, Line A—A passes through the center point and is common to the opposite corners of all three standard film sizes when they are positioned with the long dimension running front to back (longitudinal axis).

Also, Line B—B can be drawn passing through the same center point and is common to the opposite corners of all three rectangular sizes when they are oriented with the long dimensions running side to side (transverse axis).

It follows, therefore, that if suitably shaped clamping parts are used and connected such that they move at equal rates towards and away from center point (X) along either A—A and/or line B—B, the clamping parts will contact the rectangle at the corners. Such clamping parts (48, 50) are shown in FIG. 3.

Further, since a different line is used for each of the two basic orientations, this provides a method for sensing upon which axis (i.e., longitudinal or transverse) the cassette is oriented.

Figure 4:
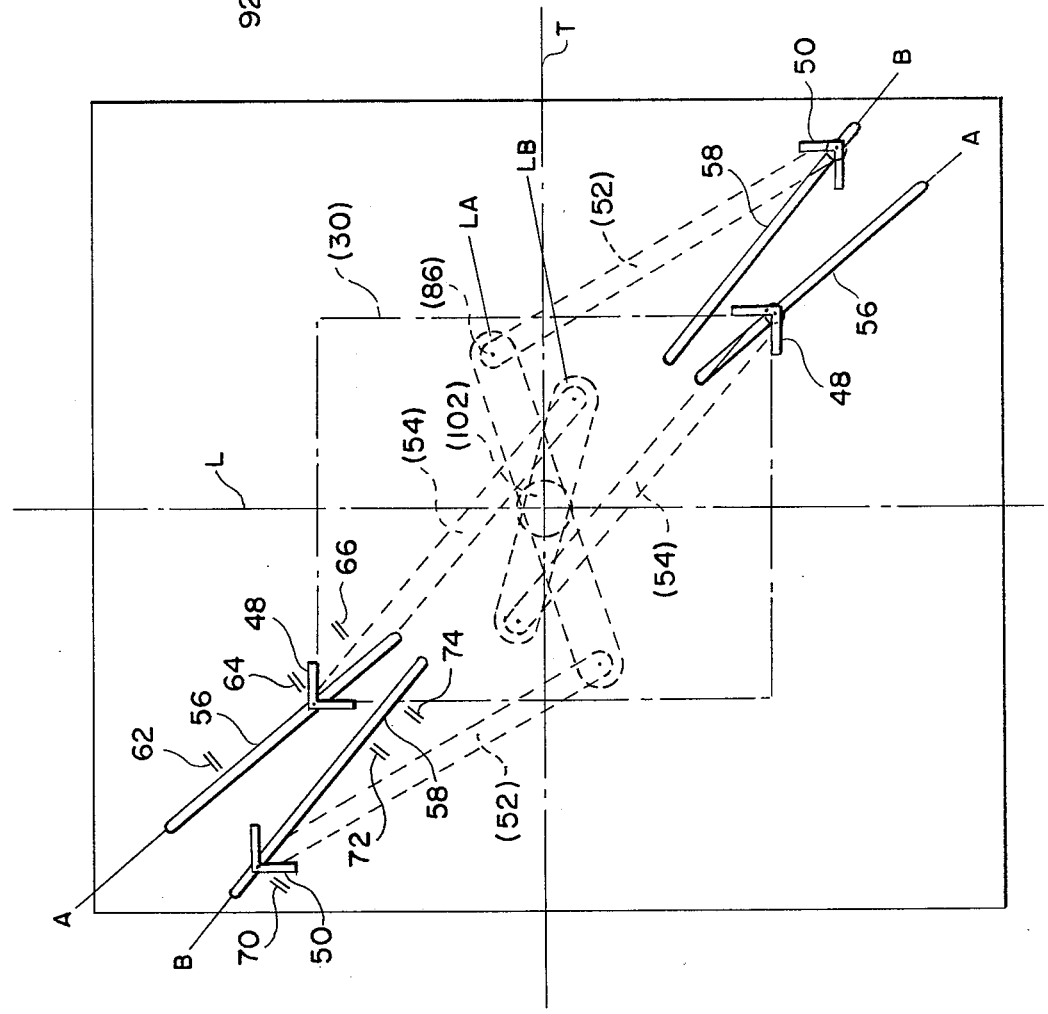
FIG. 4 is a top plan view, partially in phantom, showing positioning of the corner abutting clamps in the aligned slots along the pair of slots A—A (longitudinal axis L) and a pair of slots B—B (transverse axis T) and associated linkage.
Figure 9:
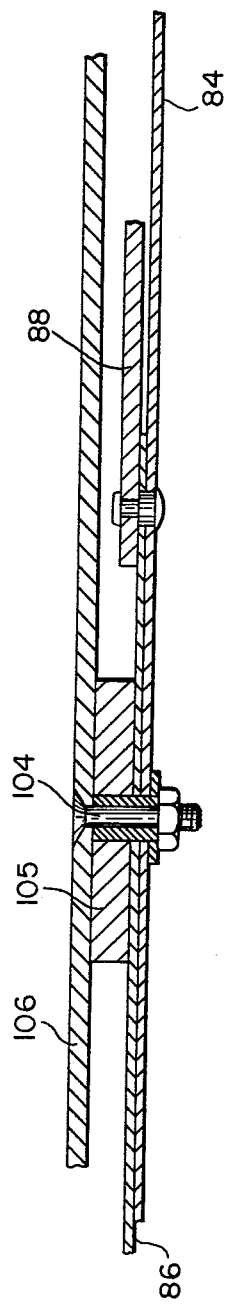
FIG. 9 is a central section, taken along section line 9—9, showing pivoting of the central linkage member with respect to the base.
Figure 10:
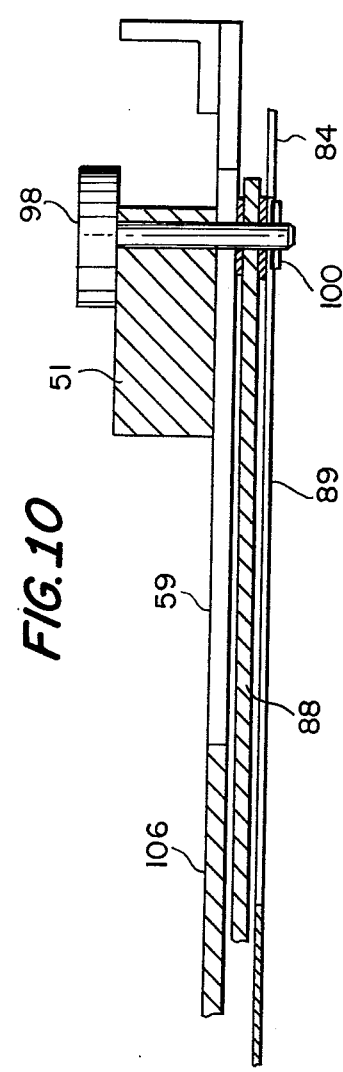
FIG. 10 is a fragmentary vertical section taken along section line 10—10, showing employment of the knurled knob tension locking member with respect to the clamping member.
Figure 11:
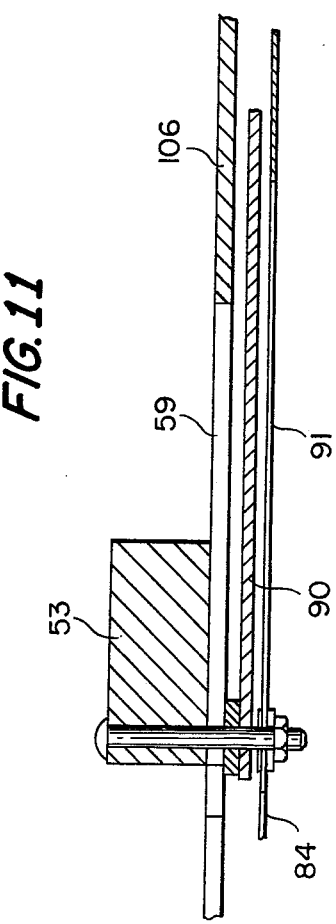
FIG. 11 is a fragmentary vertical section showing employment of the opposed clamping members with associated linkage.

Manifestly, many designs may be employed according to the present method. For example, FIG. 4 shows one approach using separate pairs of centering and holding devices 48, 50 for each orientation position. Each pair of holding devices have its own linkage connections 52, 54, together with suitable means 98 for locking the clamps into place once the cassette is positioned.

Aligned slot 56, 58 are provided to guide the holding devices along the lines representing Lines A & B previously described.

Sensing points 62, 64, 66 and their Line B—B counterparts 70, 72, 74 usually electrical, can easily be located along both slots 56, 58 to sense both orientation and size of the cassette being held. FIG. 6 is an example of a suitable electric circuit. One group of sensors consisting of three sets of two electrical contacts can be located relative to the holding devices or the linkage connecting them such that individual contact points, for example (P1 & P2) are closed for each of the specific positions of the holding devices.

Electrical resistances can be used to differentiate the specific distances by connecting a different value resistor 76, 78, 80 to one side of each set of contacts.

It is obvious that if an electrical potential is applied at C and contacts P1 and P2 are closed, a specific voltage would be between points A and C. Likewise if contacts P5 and P6 are closed, a different voltage would be between points A and C. These different voltage values differentiate cassette size. If contacts on the other slot P3 and P4 are closed, the same voltages representing "size" would be between B and C indicating a second cassette position.

FIG. 5 shows another design of the basic concept wherein only one set of clamping devices 51 –53 is used. The two slots 57, 59 are connected by arcuate slot 82 such that the holding devices can be moved from one slot to the other. A slotted guide bar 84, used to interconnect clamping devices 51 and 53 by means of pivoting link 86 and actuator arms 88, 90 which retain clamping devices 51 and 53. equidistantly from the center point. As the clamping devices 51 and 53 are moved from one slot to the other, for example from 57 to 59, guide bar 84 rotates through angle (a), such that a slot 56 in the guide bar 84 aligns with its corresponding slot 57 in the top surface 32 of the holding device.

Figure 7:
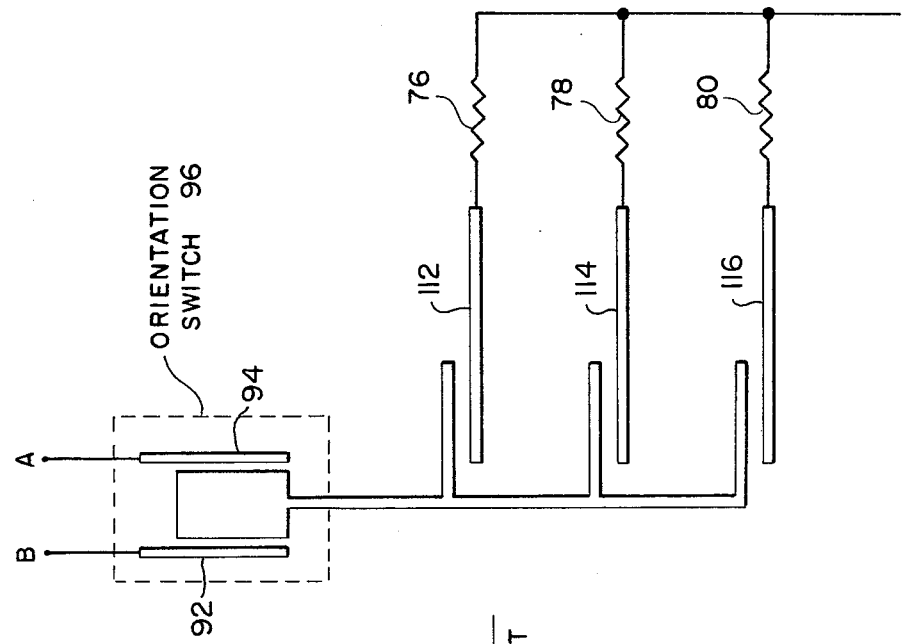
FIG. 7 is another circuit diagram showing the employment of a longitudinal and transverse axis orientation switch.

Sensor points 92, 94 can easily be located to determine which slot the holding devices are in, thus identifying longitudinal or transverse orientation of the cassette and film. Additional sensor points can also be located along slots 57, 59 or relative to the linkage to determine the size of the cassette. In FIG. 7 a suitable circuit, embodying sensor points 92, 94 is illustrated as comprised of orientation switch 96, together with those three pairs of contacts illustrated in FIG. 6.

I claim:

1. A flat plane holding fixture for objects having diametrically opposed corners comprising:
    (A) a base plate including a first pair of aligned slots, defining selective orientation of the object being held upon a longitudinal axis and a second pair of similarly aligned slots defining selective orientation of the object being held upon a transverse axis;
    (B) pairs of opposed clamps slideably mounted within said pairs of aligned slots, so as to abut opposed corners of said object being held;
    (C) linkage pivoted at the center point intersection of longitudinal and transverse axes of said object being held and interconnecting said clamps beneath said base, so as to govern constant equidistant disposition of said clamps with respect to said center point; and
    (D) an electrically energized sensing circuit having:
        (i) at least one sensor adjacent a slot in each said pair;
        (ii) switch means closable, as one of said clamps abuts said sensor; and
        (iii) indicator means indicating closing of said switch and, thus, the size and orientation of said object.

2. A flat plane holding fixture for objects having diametrically opposed corners as in claim 1, including a plurality of said sensors, indicating both the size and orientation of objects being held.

3. A flat plane holding fixture for objects having diametrically opposed corners as in claim 2, including an electrically energized sensing circuit embodying said sensors, switch means and indicators so as to indicate use of said clamps in both said first pair of slots and said second pair of slots and, thereby, indicating, respectively, longitudinal and transverse orientation of said object being held.

4. A flat plane holding fixture for objects having diametrically opposed corners as in claim 3, said sensors indicating the distance between clamps in each said pair of slots as a factor of the size of the object being held.

5. A flat plane holding fixture for objects having diametrically opposed corners as in claim 4, said clamps being particularly adapted for holding X-ray cassettes.

6. A flat plane holding fixture for objects having diametrically opposed corners as in claim 5, including separate linkage for each said pairs of slots and pivotable at said center point.

* * * * *